(12) United States Patent
Schmitt et al.

(10) Patent No.: US 12,111,295 B2
(45) Date of Patent: Oct. 8, 2024

(54) SYSTEM AND METHOD FOR HIGH STRAIN RATE TESTING OF MATERIAL USING GRAVITY DRIVEN DROP TOWER

(71) Applicant: Veryst Engineering, LLC, Needham, MA (US)

(72) Inventors: Eric C. Schmitt, Boston, MA (US); Sean S. Teller, Mansfield, MA (US); Jorgen S. Bergstrom, Medfield, MA (US); Dennis Beynor, Charlotte, NC (US)

(73) Assignee: Veryst Engineering, LLC, Needham, MA (US)

( * ) Notice: Subject to any disclaimer, the term of this patent is extended or adjusted under 35 U.S.C. 154(b) by 468 days.

(21) Appl. No.: 17/476,354

(22) Filed: Sep. 15, 2021

(65) Prior Publication Data
US 2022/0091002 A1     Mar. 24, 2022

Related U.S. Application Data

(60) Provisional application No. 63/082,240, filed on Sep. 23, 2020.

(51) Int. Cl.
*G01N 3/303*     (2006.01)
*G01N 3/06*      (2006.01)

(52) U.S. Cl.
CPC ............ *G01N 3/303* (2013.01); *G01N 3/066* (2013.01); *G01N 3/068* (2013.01);
(Continued)

(58) Field of Classification Search
CPC ........ G01N 3/303; G01N 3/066; G01N 3/068; G01N 2203/001; G01N 2203/0014;
(Continued)

(56) References Cited

U.S. PATENT DOCUMENTS 1,985,478 A * 12/1934 Yuasa ............... G01N 3/303
                                                    236/1 E
6,389,876 B1 * 5/2002 Tanimura ........... G01N 3/06
                                                    73/12.09
(Continued)

FOREIGN PATENT DOCUMENTS

CN       109115597 A  *  1/2019   ............. G01N 3/02
CN       208568502 U  *  3/2019   ............. G01N 3/303
CN       110553932 A  * 12/2019   ............. G01M 7/08

*Primary Examiner* — Marrit Eyassu
(74) *Attorney, Agent, or Firm* — Morse, Barnes-Brown & Pendleton, P.C.; Sean D. Detweiler, Esq.

(57) ABSTRACT

A drop tower apparatus and method of use is provided. The drop tower apparatus includes a base, a frame, a top member, rails, a sled, a triggering system, and a test fixture. The frame extends from the base. The top member is disposed on the frame opposite the base. The rails extend from the base to the top member and are disposed within the frame. The sled is configured to slide vertically along the length of the rails and is releasably connected to the winch of the top member. The test fixture is configured to receive a sample for testing. The winch of the top member raises the sled to a desired height, the sled is released at the desired height and slides along the rails resulting in an impact on a sample placed in the test fixture.

17 Claims, 5 Drawing Sheets

(52) U.S. Cl.
CPC .............. *G01N 2203/001* (2013.01); *G01N 2203/0014* (2013.01); *G01N 2203/0033* (2013.01); *G01N 2203/0623* (2013.01); *G01N 2203/0641* (2013.01)

(58) Field of Classification Search
CPC ... G01N 2203/0033; G01N 2203/0623; G01N 2203/0641; G01N 2203/0019
USPC .......................................................... 73/800
See application file for complete search history.

(56) References Cited

U.S. PATENT DOCUMENTS 10,444,132 B2 * 10/2019 Howie .................... G01N 3/303
10,481,057 B1 * 11/2019 Song ....................... G01N 3/303

* cited by examiner

SYSTEM AND METHOD FOR HIGH STRAIN RATE TESTING OF MATERIAL USING GRAVITY DRIVEN DROP TOWER

CROSS-REFERENCE TO RELATED APPLICATION(S)

This application claims priority to, and the benefit of, U.S. Provisional Application 63/082,240, filed Sep. 23, 2020, for all subject matter common to both applications. The disclosure of said provisional application is hereby incorporated by reference in its entirety.

FIELD OF THE INVENTION

The present invention relates to high strain rate testing suitable for material testing and modeling. In particular, the present invention relates to a gravity driven drop tower.

BACKGROUND

Several systems have been developed to perform high strain rate testing. Existing systems include Servo-hydraulic systems, the Split Hopkinson Pressure Bar (or Kolsky Bar) (SHPB) systems and drop tower systems.

However, these conventional systems all experience some shortcomings. The systems have a ramp-up time when performing tests, so that initial data is not at higher rates. These systems also use overly bulky and poorly designed fixtures, which introduce noise and data uncertainty. Such existing systems further do not allow tension, compression, shear, and other test modes to be tested easily with one system. In addition, these prior existing systems do not allow for testing to large strains for polymers. The design and structure of these prior existing devices makes it difficult to test polymer materials in general.

SUMMARY

There is a need for the ability to test materials, including polymer materials, at high strain rates, in an improved manner. The present invention is directed toward further solutions to address this need, in addition to having other desirable characteristics. Specifically, the present invention provides a gravity driven drop tower system that has lower ramp-up time, introduces less noise, and can be easily adapted to test tension, compression, shear and other test modes.

In accordance with example embodiments of the present invention, a drop tower apparatus is provided. The drop tower includes a base, a frame, a top member, rails, a sled, a triggering system, and a test fixture. The frame extends from the base. The top member is disposed on the frame opposite the base. The top member has a winch. The rails extend from the base to the top member. The rails are disposed within the frame. The sled is configured to slide vertically along the length of the rails and is releasably connected to the winch. The test fixture is configured to receive a sample for testing. The winch of the top member raises the sled to a desired height, the sled is released at the desired height and slides along the rails resulting in an impact on a sample placed in the test fixture.

In accordance with aspects of the present invention, the winch comprises a motor.

In accordance with aspect of the present invention, the triggering system comprises a high-speed optical sensor.

In accordance with aspect of the present invention, the drop tower apparatus further includes a camera configured to monitor impact on the sample and triggered by the triggering system.

In accordance with aspect of the present invention, the test fixture further includes a piezo-electric load sensor configured to measure impact on the sample and triggered by the triggering system.

In accordance with aspect of the present invention, the frame is formed of extruded aluminum.

In accordance with aspect of the present invention, the test fixture comprises a tension fixture. The tension fixture includes a base, a tension support structure, an upper retaining member, and a lower retaining member. The tension support structure extends from the base. The upper retaining member is disposed on the tension support structure opposite the base and has a tension grip configured to hold an end of a sample. The lower retaining member has an impact surface and is configured to hold an opposite end of a sample and to slide vertically along the tension support structure. When the sled impacts on the sample, the sled passes over the upper retaining member of the tension fixture and impacts the impact surface of the lower retaining member. In certain aspects, the sled comprises a passage therethrough sized and dimensioned to allow the passage of the upper retaining member through the sled while engaging the impact surface of the lower retaining member. In certain other aspects, the tension grip of the upper retaining member is formed of titanium.

In accordance with aspect of the present invention, the test apparatus comprises a compression fixture. The compression fixture includes an upper portion and a lower portion. The upper portion is disposed on the sled and has a compression platen with a shear pin fixture. The lower portion is disposed on the base and has a compression platen configured to receive the sample. When the sled impacts the sample, the compression platen on the upper portion impacts the sample which in turn impacts the compression platen on the lower portion.

In accordance with aspect of the present invention, testing can be performed between 100 mm/s to 10000 mm/s.

In accordance with example embodiments of the present invention, a method for testing materials at high strain and high strain rate is provided. The method includes providing a drop tower as disclosed herein, placing a sample in the test fixture; raising the sled of the drop tower, using the winch, to a desired height; releasing the sled; and measuring the impact of the sled on the sample.

In accordance with aspect of the present invention, measuring of the impact is initiated by the triggering system.

In accordance with aspect of the present invention, the test fixture comprises a tension fixture as disclose herein.

In accordance with aspect of the present invention, the test fixture comprises a compression fixture as disclosed herein.

In accordance with example embodiments of the present invention, a drop tower apparatus is provided. The drop tower apparatus includes a base, a frame, a top member, rails, a sled, a triggering system, and a tension test fixture. The frame extends from the base. The top member is disposed on the frame opposite the base. The top member has a winch. The rails extend from the base to the top member. The rails are disposed within the frame. The sled is configured to slide vertically along the length of the rails and is releasably connected to the winch. The tension test fixture is configured to receive a sample for testing.

The tension test fixture includes a base, a tension support structure, and upper retaining member, and a lower retaining member. The tension support structure extends from the base. The upper retaining member is disposed on the tension support structure opposite the base and has a tension grip configured to hold an end of a sample. The lower retaining member has an impact surface and is configured hold an opposite end of a sample and to slide vertically along the tension support structure. The winch of the top member raises the sled to a desired height, the sled is released at the desired height and slides along the rails resulting in an impact on a sample placed in the test fixture. The sled passes over the upper retaining member of the tension fixture and impacts the impact surface of the lower retaining member, which imparts loading to the sample.

In accordance with example embodiments of the present invention, a drop tower apparatus is provided. The drop tower apparatus includes a base, a frame, a top member, rails, a sled, a triggering system, and a compression test fixture. The frame extends from the base. The top member is disposed on the frame opposite the base. The top member has a winch. The rails extend from the base to the top member. The rails are disposed within the frame. The sled is configured to slide vertically along the length of the rails and is releasably connected to the winch. The compression test fixture is configured to receive a sample for testing.

The compression test fixture includes an upper portion and a lower portion. The upper portion is disposed on the sled and has a compression platen with a shear pin fixture. The lower portion is disposed on the base and has a compression platen configured to receive the sample. The winch of the top member raises the sled to a desired height, the sled is released at the desired height and slides along the rails resulting in an impact on a sample placed in the test fixture. When the sled impacts the sample, the compression platen on the upper portion impacts the sample which in turn impacts the compression platen on the lower portion.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
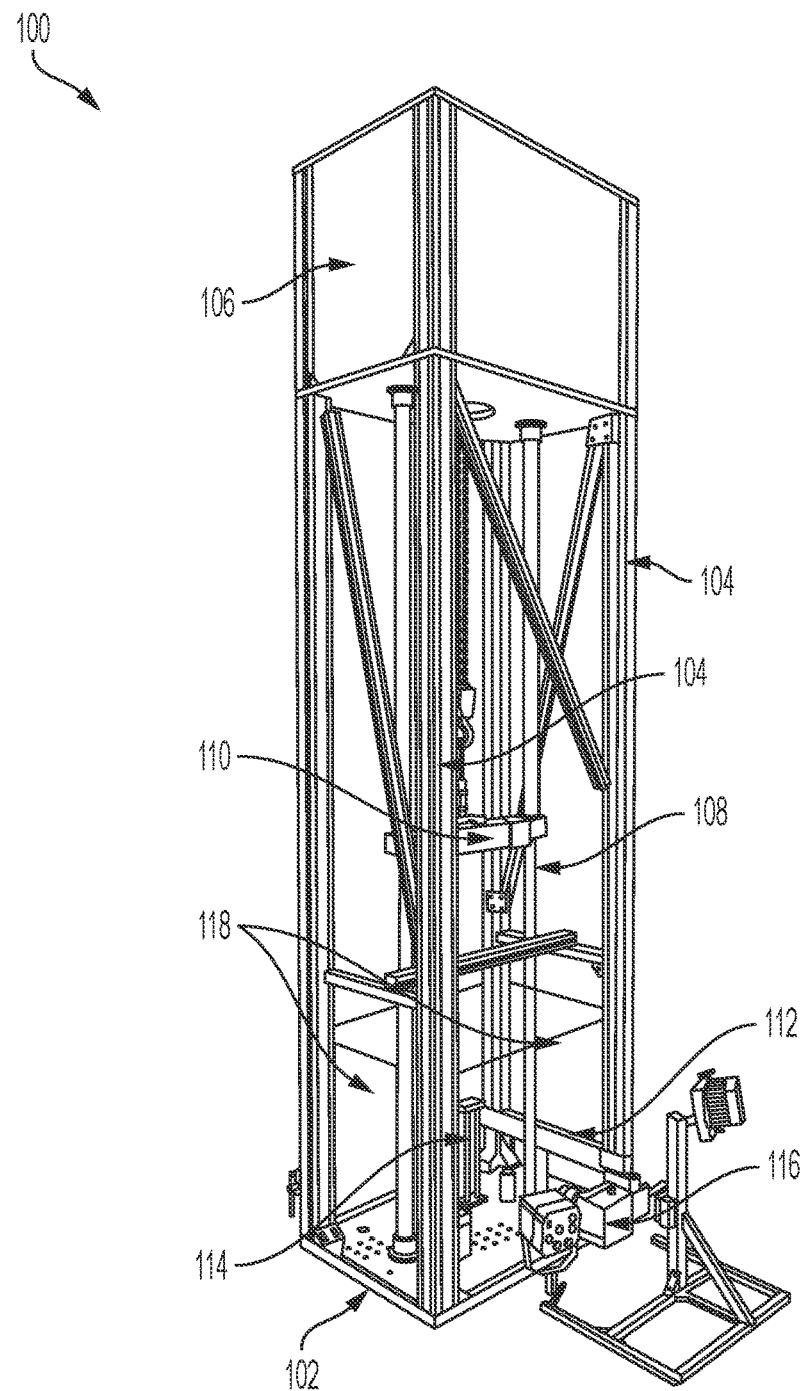
FIG. 1 is perspective view of a drop tower apparatus in accordance with an example embodiment of the present invention.

An illustrative embodiment of the present invention relates to a system and methodology for testing materials, including polymer materials, at high strain rates. The gravity driven drop tower system of the present invention provides lower ramp-up time, introduces less noise, and can be easily adapted to test tension, compression, shear and other test modes, providing much improved operability and functionality over prior systems.

FIG. 1 through FIG. 5, wherein like parts are designated by like reference numerals throughout, illustrate an example embodiment or embodiments of a drop tower apparatus and methods of using such, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

An example embodiment of a drop tower apparatus 100 of the present invention can be seen in FIG. 1. The drop tower apparatus 100 comprises a base 102, a frame 104, a top member 106, rails 108, a sled 110, a triggering system 112, and a test fixture 114. In certain embodiments, the drop tower apparatus 100 may further comprise one or more cameras 116 for monitoring impacts on samples 318. Additionally, transparent walls 118, formed of glass, plastic, or composite, can protect the inner workings of the apparatus 100 while providing a view of operation from outside the apparatus 100.

The base 102 is designed, shaped, and configured to rest on the ground or other support surface and provide a foundation supporting the other elements of the drop tower apparatus 100. The base 102 is formed of a material or combination of materials that provides stability, strength, rigidity, and vibration resistance. In certain embodiments, the base 102 is formed of metal, such as steel. In some embodiments the base 102 includes holes or other mounting features for mounting or otherwise attaching the frame 104, rails 108, test fixture 114 or other components to the base 102. Other possible configurations will be apparent to one skilled in the art given the benefit of this disclosure.

The frame 104 extends from the base 102. In the example of FIG. 1, the frame 104 comprises four posts extending upward from the corners of the base 102 with cross supports or struts to provide extra strength and rigidity to the structure. The frame 104 is formed of a material or combination of materials that provides stability, strength, rigidity, and vibration resistance. In certain embodiments, the frame 104 is formed of metal, such as steel, or extruded aluminum. In some embodiments the frame 104 includes mounting features for mounting or otherwise attaching components to the frame. For example, in FIG. 1, transparent safety shields or walls 118 are attached to the frame 104 in proximity to the base 102 to enclose the test fixture 114. Other possible configurations will be apparent to one skilled in the art given the benefit of this disclosure.

Figure 2:
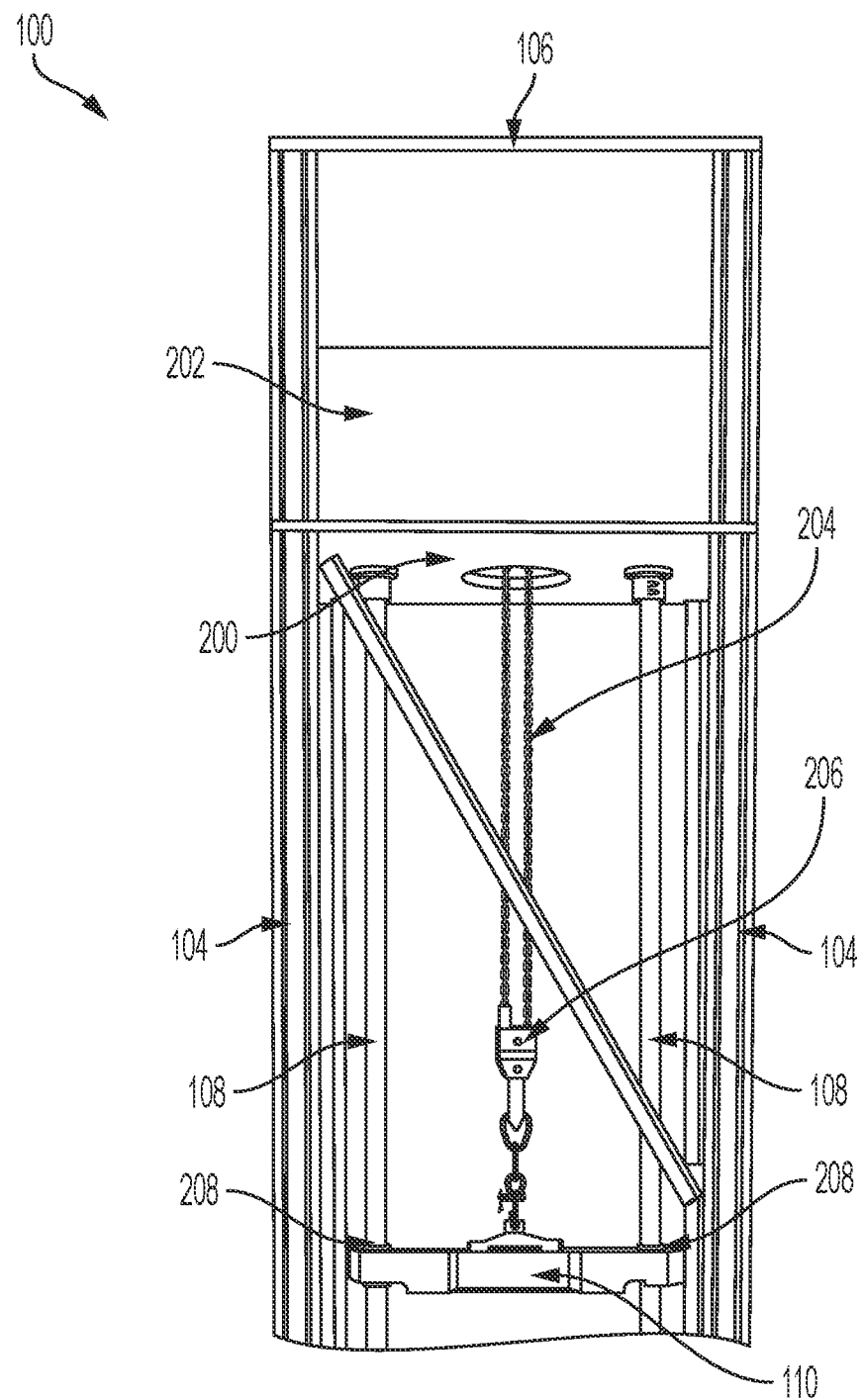
FIG. 2 is a front view of the upper portion of the drop tower.

The top member 106 is disposed on the frame 104 opposite of the base 102. The top member 106 has a winch disposed therein. As can be seen in FIG. 2, the top member 106 can further include a top plate 200 attached to the frame 104. In this example, the top plate 200 extends across the span of frame 104 similar to the base 102. The top plate 200 provides additional stability, strength, rigidity, and vibration resistance to the drop tower apparatus 100 and as such is formed of a suitable material, or combination of materials, such as a metal like steel or aluminum. Other possible configurations will be apparent to one skilled in the art given the benefit of this disclosure.

In the example embodiments of FIG. 1 and FIG. 2, the winch of the top member 106 includes a motor 202 mounted above the top plate 200. In certain embodiments, the motor 202 is an electric motor. The motor 202 is connected to a lift chain 204 which passes through the top plate 200 and is connected to a release hook 206 which in turn is releasably connected to the sled 110. Other possible configurations will be apparent to one skilled in the art given the benefit of this disclosure.

The rails 108 extend from the base 102 to the top member 106 and are disposed within the frame 104. The rails 108 are configured to act as guides directing the motion of the sled 110 and constraining the motion of the sled 110 to a vertically oriented plane. In the example embodiments of FIG. 1 and FIG. 2, there are two rails 108 comprising rods or shafts having a round and smooth exterior surface for the sled 110 to ride, slide, or glide along. The rails 108 are attached to the base 102 and the top plate 200 of the top member 106. The rails 108 provide stability, strength, rigidity, vibration resistance, and a suitably low friction surface for the sled 110 to ride, slide, or glide along and as such may be formed of suitable material, or combination of materials, such as a metal like steel or aluminum. The rails 108 may be solid or hollow. In certain embodiments, the rails 108 may be coated in a lubricant or other material to further reduce the friction of their surface. In some embodiments, the rails 108 may be keyed, shaped, or have configurations to assist or further guide the sled 110 in sliding, gliding, or riding along the rails 108. Other possible configurations will be apparent to one skilled in the art given the benefit of this disclosure.

The sled 110 is configured to slide, ride, or glide vertically along the rails 108 between the base 102 and the top member 106. The sled 110 is releasably attached to the winch such that the sled 110 can be lifted to a desired height by the winch and then be released to slide along the rails 108 and impact with a test fixture 114. In the example of FIG. 1 and FIG. 2, the sled 110 is releasably connected to the lift chain 204 by release hook 206 allowing it to be lifted to a desired height, as seen in FIG. 2, by the motor 202 in the top member 106.

The sled 110 has a mass and structural rigidity to provide a suitable impact on a sample 318 in a test fixture 114 while minimizing noise and vibration to 20 Newtons or less. In certain embodiments, the sled 110 is formed of a metal. In some embodiments, the weight or mass of the sled 110 is adjustable. In certain embodiments, the sled 110 may be provided with mounting holes or mounting features for mounting components on the sled 110. In some embodiments, the sled 110 is configured to pass over or by portions of a test fixture 114 when the sled impacts a sample 318 in the test fixture 114.

In the example of FIG. 1 and FIG. 2, the sled 110 includes fittings 208 configured for mounting the sled 110 upon and around the rails 108, such that the sled 110 can only move in a vertical plane in relation to the rails 108. In certain embodiments, the fittings 208 where the sled 110 mates with and slides, rides, or glides along the rails 108 further includes components, material, and/or coatings that further reduces friction and vibration between the sled 110 and rails 108. Other possible configurations will be apparent to one skilled in the art given the benefit of this disclosure.

The triggering system 112 is configured to initiate measurements of an impact of the test sled 110 upon a sample 318 in a test fixture 114. In certain embodiments, the triggering system 112 comprises a high-speed optical sensor. In the example of FIG. 1 the triggering system 112 is located in proximity of the test fixture 114. In some embodiments, the triggering system 112 is mounted to or otherwise attached to the base 102 or frame 104 of the drop tower apparatus 100. Other possible configurations will be apparent to one skilled in the art given the benefit of this disclosure In some embodiments, such as the example of FIG. 1, the triggering system 112 triggers one or more cameras 116 to capture the impact of the test sled 110 upon a sample 318 in a test fixture 114. The one or more cameras are located in proximity of the test fixture. In some embodiments, the one or more cameras 116 are mounted to or otherwise attached to the base 102 or frame 104 of the drop tower apparatus 100. In certain embodiments, the one or more cameras 116 include a high-speed camera. The one or more cameras 116 record the sample deformation during the test. The images are analyzed using a technique called Digital Image Correlation (DIC) to calculate the applied strain and strain rate. Other possible configurations will be apparent to one skilled in the art given the benefit of this disclosure.

The test fixture 114 is configured to receive a sample 318 of a material to be tested. The sample 318 is mounted or otherwise situated in the test fixture 114. The test fixture 114 is in turn situated on the base 102 in line with the vertical path of the sled 110 such that a sled 110, dropped from a designated height, sliding along the rails 108 impacts with the sample 318 in test fixture 114. In certain embodiments, the test fixture 114 is mounted or otherwise attached to the base 102. For example, in embodiments where the base 102 includes mounting features 310, the test fixture 114 can be mounted to the base 102 using such mounting features 310.

The test fixture 114 formed of a material or materials that can withstand impacts from the sled while minimizing noise and/or vibration. Examples of suitable materials include aluminum, steel, titanium, or other alloys. In certain embodiments, the test fixture 114 further includes sensors which can be triggered by the triggering system 112. In some such embodiments, the sensors include piezo-electric load sensor. The configuration of the test fixture 114 depends on the type of testing being performed.

Figure 3:
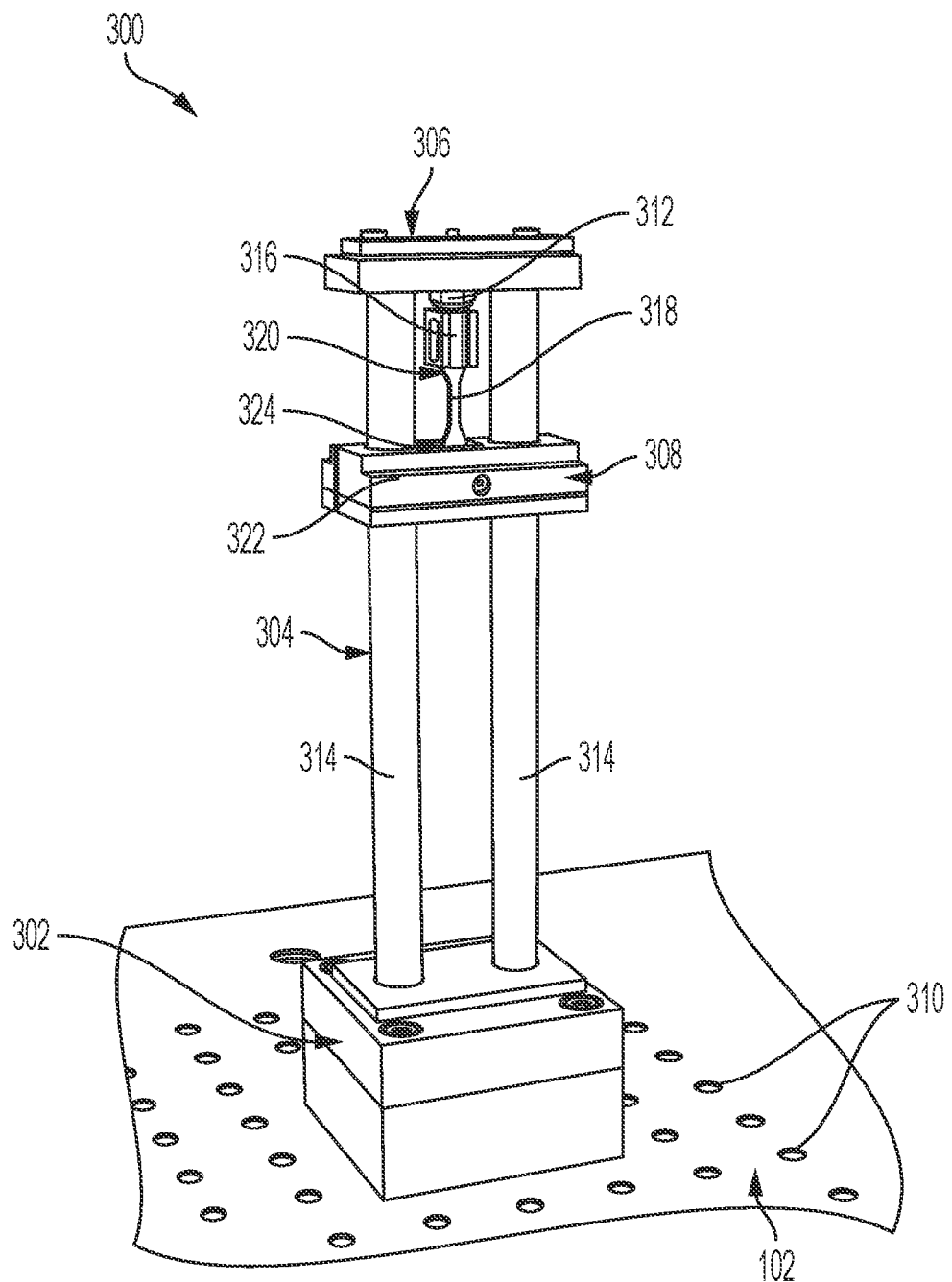
FIG. 3 is a perspective view of a tension test fixture in accordance with an example embodiment of the present invention.

An example of a test fixture 114 configured to test tension can be seen in FIG. 3. The tension fixture 300 comprises a base 302, a tension support structure 304, an upper retaining member 306, and a lower retaining member 308.

The base 302 of the tension fixture 300 is designed, shaped, and configured to rest on the base 102 of the drop tower apparatus 100 and provide a foundation supporting the other elements of the tension fixture 300. The base 302 is formed of a material or combination of materials that provides the stability, strength, rigidity, and vibration resistance. In certain embodiments, the base 302 is formed of metal, such as steel, or titanium. In some embodiments, the base 302 of the tension fixture 300 is configured to attach or mount to the base 102 of the drop tower apparatus 100 using provided holes or other mounting features 310. In certain embodiments, the base further includes a sensor, such as a piezo-electric load sensor. Other possible configurations will be apparent to one skilled in the art given the benefit of this disclosure.

The tension support structure 304 extends from the base 302 of the tension fixture 300. The tension supports structure 304 provides similar functionality for the tension fixture 300 as the frame 104 and rails 108 provide in the drop tower apparatus 100. That is, the tension support structure 304 provides both the support for the upper retaining member 306 and acts as a guide for the sliding of the lower retaining member 308. In the example of FIG. 3, the tension support structure 304 comprises two posts 314 extending upward from the base 302. The tension support structure 304 is formed of a material or combination of materials that provides stability, strength, rigidity, vibration resistance as well a suitably low friction surface for the lower retaining member 308 to ride, slide, or glide along and as such may be formed of suitable material such as a metal like steel or aluminum. The posts 314 may be solid or hollow. In certain embodiments, the posts 314 may be coated in a lubricant or other material to further reduced the fiction of their surface. Other possible configurations will be apparent to one skilled in the art given the benefit of this disclosure.

The upper retaining member 306 is disposed on the tension support structure 304 opposite the base 302. The upper retaining member 306 has a tension grip 316 configured to hold a first end 320 of a sample 318. The upper retaining member is sized, dimensioned, and configured such that the sled 110 of the drop tower apparatus 100 can pass by or over the upper retaining member 306 to engage the lower retaining member 308 when the sled 110 impacts the sample 318. The tension grip 316 is configured to secure the first end 320 of the sample 318 such that measurements can be taken during an impact on the sample 318 by the sled 110 without interfering with the operation of the sled 110 and, as such, is formed of a material or materials that can provides strength, rigidity, and vibration reduction in a relatively small form factor such as a metal, alloy, polymer, or composite. In some embodiments the upper retaining member is formed of titanium. In certain embodiments, the upper retaining member can further include a sensor, such as a piezo-electric load sensor 312. In some such embodiments, the sensor 312 and tension grip 316 are configured such that they can be rotated and locked into position. Other possible configurations will be apparent to one skilled in the art given the benefit of this disclosure.

The lower retaining member 308 includes an impact surface 322 and is configured to hold an opposite end 324 of a sample 318 and to slide vertically along the tension support structure 304. The lower retaining member is shaped, dimensioned, and configured such that when the sled 110 impacts on the sample 318, the sled 110 passes over the upper retaining member 306 of the tension fixture 300 and impacts the impact surface 322 of the lower retaining member 308. In some such embodiments, the sled 110 is further configured to pass over or by the upper retaining member 306. For example, the sled 110 may include a cavity or passage sized and dimensioned to fit over or around the upper retaining member 306.

In the example of FIG. 3, the lower retaining member 308 comprises two parts that are secured together to hold the opposite end 324 of the sample 318 and enclose the posts 314 of the tension support structure 304 such that the lower retaining member 308 can slide vertically along the posts 314 with only the sample 318 held between the upper retaining member 306 and the lower retaining member 308 impeding the movement of the lower retaining member 308 along the posts 314 of the tension support structure 304. This manner of securing or otherwise holding the sample 318 during impact with the sled 110 allows for the testing of tensile strength of materials. In certain embodiments, shock or vibration dampening materials such as foam, rubber, or other deformable materials, can be applied to the impact surfaces 322 to dampen the vibration of the impact of the sled 110 on the lower retaining member 308. In some such embodiments, the amount of damping can be tuned by swapping the shock or vibration dampening material to achieve a desired level of damping. Other possible configurations will be apparent to one skilled in the art given the benefit of this disclosure.

Figure 4A:
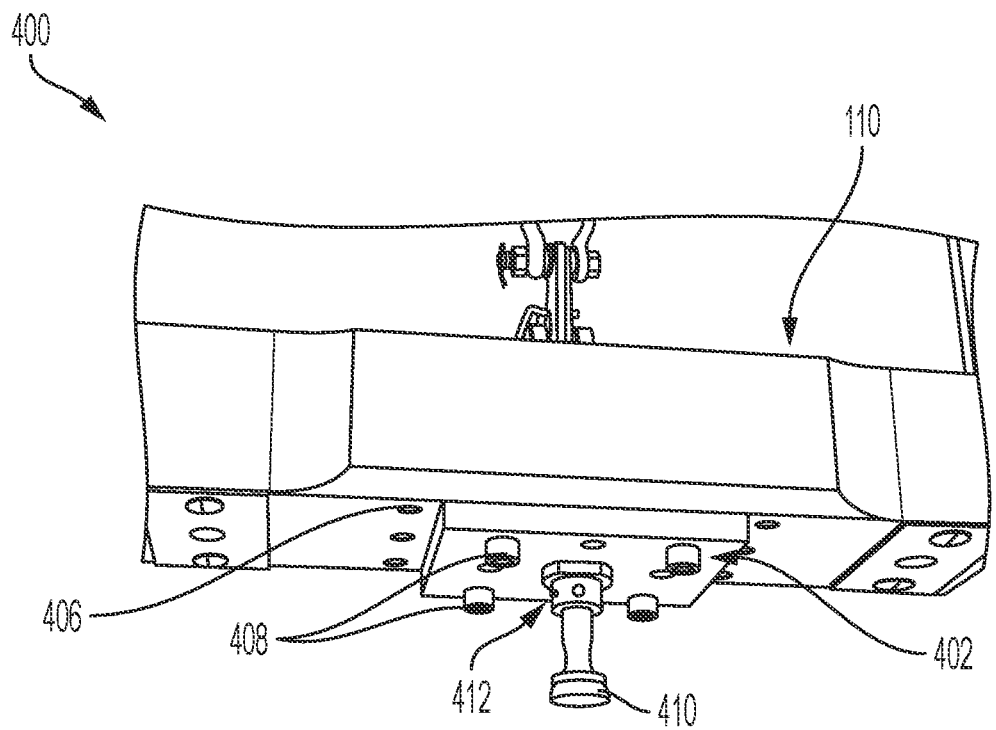
FIG. 4A is a perspective view of an upper portion of a compression test fixture in accordance with an example embodiment of the present invention.
Figure 4B:
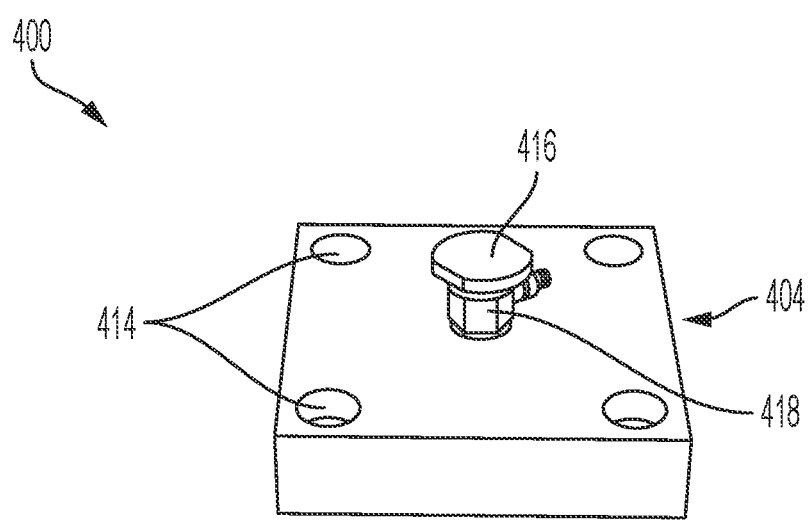
FIG. 4B is a perspective view of a lower portion of a compression test fixture in accordance with an example embodiment of the present invention.

An example of a test fixture 114 configured to test compression can be seen in FIG. 4A and FIG. 4B. The compression fixture 400 comprises an upper portion 402 and a lower portion 404. The upper portion 402 is shown in FIG. 4A. The lower portion is shown in FIG. 4B.

The upper portion 402 of the compression fixture 400 is disposed on the sled 110. In certain embodiments, the upper portion 402 is mounted on or otherwise secured to the sled using holes or mounting features 406 provided on the sled 110. In the example of FIG. 4A, retaining screws or bolts 408 are used to attach the upper portion 402 to the mounting features 406 of the sled 110.

The upper portion 402 of the compression fixture 400 comprises a compression platen 410 with a shear pin fixture 412. The platen 410 is configured to impact with a sample 318 placed on the lower portion 404 of the compression fixture 400 and, as such, is formed of a material or materials capable of withstanding such impact. Examples of suitable materials include metals or alloys such as steel. The shear pin fixture 412 is a safety feature configured to break or fail if the forces being applied exceed certain thresholds that could result in damage to the components of the drop tower apparatus 100. The materials and configuration of the shear pin fixture 412 can be chosen to achieve the desired threshold failure point. Other possible configurations will be apparent to one skilled in the art given the benefit of this disclosure.

The lower portion 404 of the compression fixture 400 is disposed on the base 102. In certain embodiments, the lower portion 404 is mounted on or otherwise secured to the base using holes or mounting features 310 provided on the base 102. For example, screws or bolts can used to secure the lower portion 404 of the compression fixture 400 to the mounting features 310 of the base 102 using holes or mounting features 414 of the lower portion 404.

The lower portion 404 of the compression fixture 400 comprises a compression platen 416 configured to receive the sample 318. Typically, the sample 318 is provided in a cylinder form (not shown). With a sample 318 placed on the platen 416 of the lower portion 404 of the compression fixture 400, when the sled 110 impacts the sample 318, the compression platen 410 on the upper portion 402 impacts the sample 318 which in turn impacts the compression platen 416 on the lower portion 404. As such, the platen 416 of the lower portion 404 is configured to receive the impact of the platen 410 of the upper portion 402 upon a sample 318 placed on the platen 416 and therefore is formed of a material or materials capable of withstanding such impact. In certain embodiments, the platen 416 is configured to be as lightweight as possible. This can be done with strong and light materials such as titanium or aluminum. Reducing the weight of the platen 416 can also be achieved by removing material from the underside of the platen 416. In certain embodiments, the upper and/or lower portion further comprise one or more sensors 418, such as a piezo-electric load sensor, for measuring the impact of the sled 110 on the sample 318. Other possible configurations will be apparent to one skilled in the art given the benefit of this disclosure.

The components of the drop tower apparatus 100, including the base 102, frame 104, top member 106, rails 108, sled 110, triggering system 112, and test fixture 114 are sized, dimensioned, and configured for the type of testing desired. In some embodiments, the components of the drop tower apparatus or sized, dimensioned, and configured such that testing can be performed at between 100 mm/s to 10000 mm/s.

Figure 5:
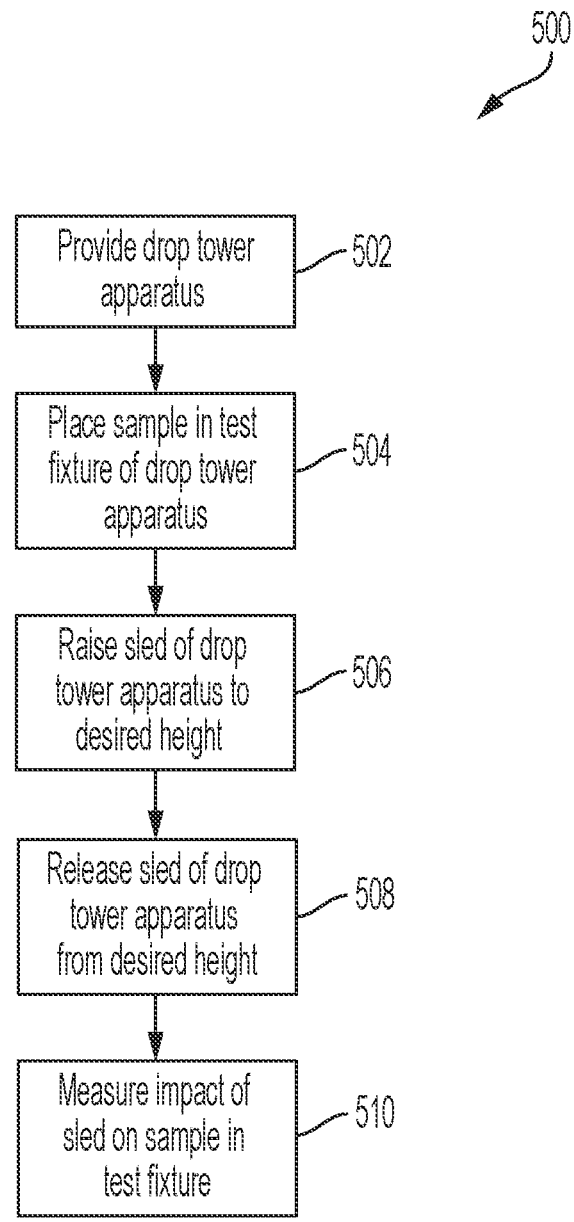
FIG. 5 is a flow diagram of a methodology for testing materials to high strain and high strain rate in accordance with an example embodiment of the present invention.

FIG. 5 depicts flow chart 500 an example methodology for testing materials at high strain and high strain rate. First, a drop tower apparatus 100 as set forth and described herein is provided (step 502). A sample 318 is then placed in the test fixture 114 of the drop tower apparatus 100 (step 504). The sled 110 of the drop tower apparatus 100 is then raised to a desired height to create a desired impact on the sample 318 using the winch (step 506). Once the sled 110 is at the desired height, the sled 110 can be released (step 508). The impact of the sled 110 on the sample 318 in the test fixture 114 can then be measured (step 510). The impact of the sled 110 on the sample 318 in the test fixture 114 can be measured by cameras 116 or sensors 312, 418 in the test fixture 114. In such embodiments, the measuring of the impact of the sled 110 on the sample 318 in the test fixture 114 can be triggered by the triggering system 112.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may exist in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A drop tower apparatus adapted to test tension or compression, the apparatus comprising:
    a base having mounting features;
    a frame extending from the base;
    a top member disposed on the frame opposite the base, the top member having a winch;
    rails extending from the base to the top member, the rails disposed within the frame;
    a sled configured to slide vertically along a length of the rails and releasably connected to the winch, the sled configured to pass over a portion of a tension test fixture and having mounting features for securing an upper compression test fixture;
    a triggering system; and
    a test fixture configured to receive a sample for testing, the test fixture comprising:
        a tension fixture for testing tension; or
        a compression fixture;
    wherein the drop tower apparatus is adapted to test tension by mounting the tension fixture to the base using the mounting features of the base or adapted to test compression by mounting the compression fixture on the base using the mounting features of the base and the sled using the mounting features of the sled; and
    wherein the winch of the top member raises the sled to a desired height, the sled is released at the desired height and slides along the rails resulting in an impact on a sample placed in the test fixture.

2. The apparatus of claim 1, wherein the winch comprises a motor.

3. The apparatus of claim 1, wherein the triggering system comprises an optical sensor.

4. The apparatus of claim 1, further comprising a camera configured to monitor impact on the sample and triggered by the triggering system.

5. The apparatus of claim 1, wherein the test fixture further comprises a piezo-electric load sensor configured to measure impact on the sample and triggered by the triggering system.

6. The apparatus of claim 1, wherein the frame is formed of extruded aluminum.

7. The apparatus of claim 1, wherein the tension test fixture comprises:
    a base mounted to the base of the apparatus using the mounting features of the base;
    a tension support structure extending from the base of the tension fixture;
    an upper retaining member disposed on the tension support structure opposite the base of the tension fixture and having a tension grip configured to hold an end of a sample; and
    a lower retaining member having an impact surface, the lower retaining member configured hold an opposite end of a sample and to slide vertically along the tension support structure;

wherein when the sled impacts on the sample, the sled passes over the upper retaining member of the tension fixture and impacts the impact surface of the lower retaining member.

8. The apparatus of claim 7, wherein the sled comprises a passage therethrough sized and dimensioned to allow the passage of the upper retaining member through the sled while engaging the impact surface of the lower retaining member.

9. The apparatus of claim 7, wherein the tension grip of the upper retaining member is formed of titanium.

10. The apparatus of claim 1, wherein the compression test fixture comprises:
an upper portion mounted on the sled using the mounting features of the sled and having a compression platen with a shear pin fixture; and
a lower portion mounted on the base using the mounting features of the base of the apparatus and having a compression platen configured to receive the sample;
wherein when the sled impacts the sample, the compression platen on the upper portion impacts the sample which in turn impacts the compression platen on the lower portion.

11. The apparatus of claim 1, wherein testing can be performed between 100 mm/s to 10000 mm/s.

12. A method for testing materials, the method comprising:
providing a drop tower apparatus adapted to test tension or compression, the drop tower apparatus comprising:
a base having mounting features;
a frame extending from base;
a top member disposed on the frame opposite of the base, the top member having a winch;
rails extending from the base to the top member, the rails disposed within the frame;
a sled configured to slide vertically along a length of the rails and releasably connected to the winch, the sled configured to pass over a portion of a tension test fixture and having mounting features for securing an upper compression test fixture;
a triggering system; and
a test fixture configured to receive a sample for testing, the test fixture comprising:
a tension fixture; or
a compression fixture;
wherein the drop tower apparatus is adapted to test tension by mounting the tension fixture to the base using the mounting features of the base or adapted to test compression by mounting the compression fixture on the base using the mounting features of the base and the sled using the mounting features of the sled;
wherein the winch of the top member raises the sled to a desired height, the sled is released at the desired height and slides along the rails resulting in an impact on a sample placed in the test fixture;
placing a sample in the test fixture;
raising the sled, using the winch, to a desired height;
releasing the sled; and
measuring the impact of sled on the sample.

13. The method of claim 12, wherein the measuring of the impact is initiated by the triggering system.

14. The method of claim 12, wherein the the tension fixture comprises:
a base mounted to the base of the drop tower apparatus using the mounting features of the base;
a tension support structure extending from the base of the tension fixture;
an upper retaining member disposed on the tension support structure opposite the base of the tension fixture and having a tension grip configured to hold an end of a sample; and
a lower retaining member having an impact surface, the lower retaining member configured hold an opposite end of a sample and to slide vertically along the tension support structure;
wherein when the sled impacts on the sample, the sled passes over the upper retaining member of the tension fixture and impacts the impact surface of the lower retaining member.

15. The method of claim 12, wherein the compression fixture comprises:
an upper portion mounted on the sled using the mounting features of the sled and having a compression platen with a shear pin fixture; and
a lower portion mounted on the base using the mounting features of the base of the apparatus and having a compression platen configured to receive the sample;
wherein when the sled impacts the sample, the compression platen on the upper portion impacts the sample which in turn impacts the compression platen on the lower portion.

16. A drop tower apparatus adapted to test tension, the drop tower apparatus comprising:
a base having mounting features;
a frame extending from the base;
a top member disposed on the frame opposite the base, the top member having a winch;
rails extending from the base to the top member, the rails disposed within the frame;
a sled configured to slide vertically along a length of the rails and releasably connected to the winch, the sled configured to pass over a portion of a tension test fixture and having mounting features for securing an upper compression test fixture;
a triggering system; and
a tension test fixture configured to receive a sample for testing, the tension test fixture comprising:
a base mounted to the base of the drop tower apparatus using the mounting features of the base;
a tension support structure extending from the base of the tension fixture;
an upper retaining member disposed on the tension support structure opposite the base of the tension fixture and having a tension grip configured to hold an end of a sample; and
a lower retaining member having an impact surface, the lower retaining member configured hold an opposite end of a sample and to slide vertically along the tension support structure;
wherein the tension test fixture mounted on the base of the drop tower adapts the drop tower to test tension;
wherein the winch of the top member raises the sled to a desired height, the sled is released at the desired height and slides along the rails resulting in an impact on a sample placed in the test fixture; and
wherein when the sled impacts on the sample, the sled passes over the upper retaining member of the tension fixture and impacts the impact surface of the lower retaining member.

17. A drop tower apparatus adapted to test compression, the drop tower apparatus comprising:
a base having mounting features;
a frame extending from base;

a top member disposed on the frame opposite of the base, the top having a winch;

rails extending from base to the top member, the rails disposed within the frame;

a sled configured to slide vertically along a length of the rails and releasably connected to the winch, the sled configured to pass over a portion of a tension test fixture and having mounting features for securing an upper compression test fixture; and a compression test fixture configured to receive a sample for testing, the compression test fixture comprising:

an upper portion mounted on the sled using the mounting features of the sled and having a compression platen with a shear pin fixture; and a lower portion mounted on the base using the mounting features of the base of the apparatus and having a compression platen configured to receive the sample;

wherein when the sled impacts the sample, the compression platen on the upper portion impacts the sample which in turn impacts the compression platen on the lower portion;

wherein the upper portion of the compression test fixture mounted on the sled and the lower portion of the compression fixture mounted on the base of the drop tower adapts the drop tower to test compression;

wherein the winch of the top member raises the sled to a desired height, the sled is released at the desired height and slides along the rails resulting in an impact on a sample placed in the test fixture, and wherein when the sled impacts the sample, the compression platen on the upper portion impacts the sample which in turn impacts the compression platen on the lower portion.

* * * * *